(12) United States Patent
Larson et al.

(10) Patent No.: US 12,390,853 B2
(45) Date of Patent: Aug. 19, 2025

(54) LEACHABLE CERAMIC MATERIALS FOR USE IN CASTING

(71) Applicant: Morgan Advanced Ceramics, Inc., Hayward, CA (US)

(72) Inventors: Eric Larson, Hayward, CA (US); Douglas McCracken, Hayward, CA (US); Norman Poeppel, Hayward, CA (US); Jennifer Kachala, Hayward, CA (US)

(73) Assignee: Morgan Advanced Ceramics, Inc., Hayward, CA (US)

( * ) Notice: Subject to any disclaimer, the term of this patent is extended or adjusted under 35 U.S.C. 154(b) by 1368 days.

(21) Appl. No.: 16/636,546

(22) PCT Filed: Jul. 27, 2018

(86) PCT No.: PCT/EP2018/070503
§ 371 (c)(1),
(2) Date: Feb. 4, 2020

(87) PCT Pub. No.: WO2019/030025
PCT Pub. Date: Feb. 14, 2019

(65) Prior Publication Data
US 2020/0406340 A1  Dec. 31, 2020

Related U.S. Application Data

(60) Provisional application No. 62/542,411, filed on Aug. 8, 2017.

(51) Int. Cl.
B22C 21/14 (2006.01)
B22C 1/00 (2006.01)
(Continued)

(52) U.S. Cl.
CPC ............... B22C 21/14 (2013.01); B22C 1/00 (2013.01); C04B 35/117 (2013.01);
(Continued)

(58) Field of Classification Search
None
See application file for complete search history.

(56) References Cited

U.S. PATENT DOCUMENTS 4,073,662 A  2/1978 Borom
4,187,266 A  2/1980 Greskovich et al.
(Continued)

FOREIGN PATENT DOCUMENTS

CN  105906331 A  8/2016
EP  2460783 A1  6/2012
(Continued)

OTHER PUBLICATIONS

Horiba Scientific, "A Guidebook to Particle Size Analysis", 2010, p. 1-30; Accessed at https://ats-scientific.com/uploads/PSA_Guidebook.pdf.*
(Continued)

Primary Examiner — Humera N. Sheikh
Assistant Examiner — Julia L Rummel
(74) Attorney, Agent, or Firm — SERVILLA WHITNEY LLC

(57) ABSTRACT

Supports for supporting mould parts and/or cores in investment casting, comprise support material comprising: —•a mechanically supportive continuous matrix phase comprising alumina; •at least one second phase interpenetrating the matrix phase and providing a pathway for leachants to penetrate into the material; wherein the support material comprises: in the range of 1 wt % and 12 wt % of the second phase; and less than 15 vol % voids.

2 Claims, 4 Drawing Sheets

(51) Int. Cl.
*C04B 35/117* (2006.01)
*C04B 38/00* (2006.01)

(52) U.S. Cl.
CPC ...... *C04B 38/0054* (2013.01); *C04B 38/0074* (2013.01); *C04B 2235/3418* (2013.01); *C04B 2235/5436* (2013.01); *C04B 2235/786* (2013.01); *C04B 2235/96* (2013.01)

(56) References Cited

U.S. PATENT DOCUMENTS

| | | | |
|---|---|---|---|
| 4,572,272 A | * | 2/1986 | Mills ........................ B22C 9/105 164/131 |
| 4,837,187 A | | 6/1989 | Frank et al. |
| 5,779,809 A | | 7/1998 | Sangeeta |
| 2008/0169081 A1 | * | 7/2008 | Frasier .................... C30B 11/14 164/258 |
| 2012/0177909 A1 | * | 7/2012 | Uchino .................... C04B 35/10 428/221 |

FOREIGN PATENT DOCUMENTS

| | | |
|---|---|---|
| GB | 1602027 | 11/1941 |
| GB | 2126569 A | 3/1984 |
| WO | 2017134138 A1 | 8/2017 |

OTHER PUBLICATIONS

Faraj, R.; Ahmed, H.; Hama ali, H.; Sherwani, A.; "8-Fresh and Mechanical Properties of Concrete made with Recycled Plastic Aggregates" from the "Handbook of Sustainable Concrete and Industrial Waste Management", 2022, p. 157-185; Accessed at https://doi.org/10.1016/B978-0-12-821730-6.00023-1.*

* cited by examiner

LEACHABLE CERAMIC MATERIALS FOR USE IN CASTING

CROSS-REFERENCE TO RELATED APPLICATIONS

This application is the National Stage entry of PCT/EP2018/070503, filed on Jul. 27, 2018, which claims priority U.S. Provisional Appln. Ser. No. 62/542,411, filed on Aug. 8, 2017, which are incorporated herein by reference in their entireties.

The present invention is a development of earlier PCT application PCT/EP2017/052209 (expected publication number, WO/2017/134138).

This invention relates to leachable ceramic materials and to their use in investment casting.

Investment Casting

Investment casting is a process in which molten metals are poured into a refractory ceramic mould designed to create a duplicate of the desired part. Casting may be done around "cores". Ceramic materials used for such purposes include chemically bonded particles of materials such as silica, zircon, aluminium silicates (e.g. mullite), and alumina. Such materials are porous with low structural integrity and are simply required to resist the pressures and temperatures implicit in the casting process. After casting these materials are removed to leave the cast product remaining.

Examples of such "core" materials include those of U.S. Pat. Nos. 4,073,662, 4,187,266, 4,837,187, 5,779,809, GB1602027, and GB2126569.

When making large items by investment casting it is frequently necessary to provide additional support to parts of the mould/core.

For such supports it is conventional to use dense ceramics, for example such as quartz and alumina rods. Such rods may be of a variety of sizes, but typically range in diameter from 0.2 to 40 mm. The present disclosure is not however limited to such ranges of diameter.

Such supports need to be removed after the casting process and it is common to leach out the ceramic.

Comparison of Quartz and Alumina

Quartz and alumina both have low trace element presence which can be a requirement with casting some materials, but both represent compromises between mechanical strength and chemical resistance.

Quartz is the traditional material of choice, since it can be leached out easily using strong aqueous solutions of hydroxides such as NaOH.

Alumina is increasingly being used as it has a higher mechanical strength than quartz. However, alumina is chemically more inert to hydroxides, and typically leach cycle times are increased from one day (for quartz) to three days (for alumina) and requires the more aggressive KOH as a strong aqueous solution.

The Scope of Disclosure

This disclosure provides materials that are mechanically stronger than quartz (i.e. MOR greater than 210 MPa—In contrast, core materials typically have a MOR of no more than 50 MPa), and yet chemically weaker than alumina, permitting shorter leach times in aqueous hydroxide solution than normal dense alumina without the strength limitation of quartz.

In a first aspect of the present invention, there are provided supports for supporting mould parts and/or cores in investment casting, comprising support material comprising:—
- a mechanically supportive continuous matrix phase comprising alumina;
- at least one second phase interpenetrating the matrix phase and providing a pathway for leachants to penetrate into the material;

wherein the support material comprises:
- in the range of 1 wt % to 12 wt % of the second phase; and
- less than 15 vol % voids Preferably, the support material comprises less than 11 wt % and more preferably less than 8 wt % and even more preferably less than 6 wt % of the second phase. Higher proportions of the second phase may result in a decrease in the mechanical integrity of the supports. Preferably the support material comprises at least 2 wt %, more preferably at least 3 wt % and even more preferably at least 4 wt % of the second phase. Lower proportions of the second phase may detrimentally affect the leachability of the supports.

The support materials preferably have less than 8 vol % voids and more preferably less than 6 vol % voids the lower the % void space the higher the mechanical integrity of the material. Preferably, the support material has at least 2 vol % and more preferably at least 4 vol % void space as too dense a support structure results in reduced leachability.

The second phase is preferably uniformly distributed throughout the matrix phase. A uniformly distributed second phase preferably has a d90 grain size (average of main length and width of grain determined by image analysis at 157× magnification) of less 45 μm, more preferably a d90 of less than 40 μm and even more preferably less than 35 μm.

A balance between the % void space and the % second phase as defined in the present invention is able achieve sufficient leachable pathways to produce the second phase pathways between the matrix phase as well maintaining the mechanical integrity of the supports. Too high a void space in the support would make it difficult for the second phase to become uniformly distributed with the matrix phase during the sintering/densification process.

The supports typically have an outer diameter of in the range 0.20 mm to 60 mm (and more preferably in the range 0.25 mm to 40 mm) and the aspect ratio of the supports is generally greater than 3. These dimensions are typically distinct from the dimensions of core and other mould parts.

The mechanically supportive matrix phase is preferably a sintered ceramic.

The second phase preferably comprises open porosity in the matrix.

The second phase preferably comprises material at grain boundaries of the matrix that is more readily attacked by leachants than the matrix.

The support structures preferably comprise a sintered aluminosilicate material, in which the matrix phase comprises a greater proportion of alumina than the second phase, and the second phase comprises a greater proportion of silica than the matrix phase.

The leachability of the supports is preferably such that at least 8 wt % and preferably at least 10 wt % of support weight is lost when the supports is exposed to NaOH at 300° F. and 185 psi for 20 hours.

The sintered aluminosilicate material preferably comprises 88 to 99 wt % alumina, more preferably 90-99 wt % alumina and even more preferably comprises 95±5 wt % alumina and yet even more preferably 96±2 wt % alumina.

In a preferred embodiment, the sintered aluminosilicate material comprises a sintered body formed from a mixture comprising alumina and silica.

The material preferably comprises at least 1 wt % of the at least one second phase, preferably more than 3 wt %, and conveniently can comprise 5±3% wt % or 5±2 wt % or 5±1 wt %. The amount of the at least one second phase may be up to 12 wt %. The scope of the invention is as set out in the claims, and in any new and inventive features described herein with reference to the following non-limitative description.

In a second aspect of the present invention, there is provided a method of manufacturing the supports of the first aspect of the present invention wherein 88 to 99 wt % of an alumina based particles are mixed with 1 to 12 wt % of silica based particles and the mixture pressed or extruded at a temperature and time sufficient to sinter and densify the mixture to form said supports.

Alumina based particles are defined as comprising preferably at least 50 wt % alumina, more preferably 80 wt % alumina and even more preferably at least 99 wt % alumina.

Silica based particles are defined as comprising preferably at least 50 wt % silica, more preferably 80 wt % silica and even more preferably at least 99 wt % silica.

Preferably, the second phase has a d50 of 25 μm or less, more preferably 15 μm or less, even more preferably more preferably 6 μm or less and yet even more preferably 1 μm or less. In a preferred embodiment, the silica in the mixture has a d50 of 0.5±0.2 μm or a d50 of 0.5±0.1 μm.

Preferably, the second phase particle size distribution is 200 Mesh or finer, more preferably a 325 mesh or finer and even more preferably a 600 mesh or finer.

The matrix phase is preferable prepared using particles which are capable of being mixed and sintered with the second phase to achieve a porosity of void % of less than 15 vol % and more preferably less than 11 vol %. Preferably, the matrix phase is characterised by particles having a d50 of less than 10 μm, more preferably less than 5 μm, even more preferably less than 3 μm and most preferably less than 1 μm.

GENERAL DISCLOSURE

Figure 1:
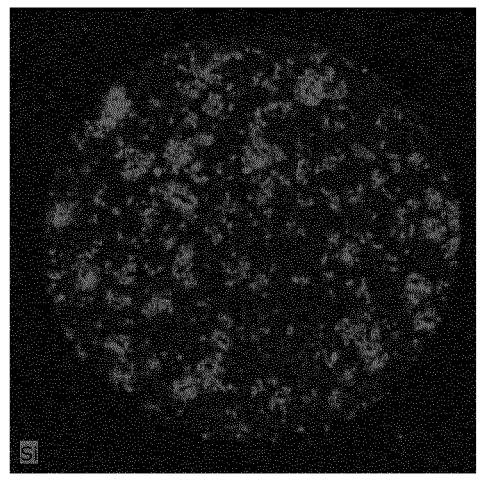
FIG. 1 is a SEM image under 157× magnification of a support having 3 wt % silica produced from 325 mesh silica particles.

The present disclosure aims to use the mechanical strength of alumina to provide materials having a greater strength than quartz, whilst providing a second phase inter-penetrating the matrix phase that permits easier access to leachants than is provided by dense alumina.

Conventional aluminas used as supports in investment casting are dense ceramics comprising very low amounts of other components (typically being 95% or more pure alumina). Typical modulus of rupture for such a material would be of the order of 550 MPa (80 kpsi). Dissolution by KOH leachant is by attack at the surface.

Conventional quartz used as supports in investment casting are glassy materials comprising essentially pure silica. Typical modulus of rupture for such a material would be of the order of 210 MPa (30 kpsi). Dissolution by NaOH or KOH leachant is by attack at the surface, and quartz is attacked more vigorously than is alumina.

The present disclosure provides an alumina containing matrix (that may incorporate other materials) and at least one second phase that interpenetrates the matrix and that provides a pathway for leachants. The second phase may comprise a leachable phase that is more readily leachable than the matrix, so that preferential leaching of the leachable phase permits leachant to penetrate below the surface.

In addition to the second phase, the matrix may comprise void space or open porosity. In either case, the effect is to increase the area of the matrix phase that is exposed to the leachant above that of the outer surface of the support. This increased leachant contact permits quicker leaching of the material of the matrix.

To achieve the required balance of good leachability and strength the second phase should preferably interpenetrate throughout the matrix phase, such that the second phase is uniformly dispersed. It has been found that the relative particle size distribution of the alumina matrix phase and the second phase is an important parameter to achieve a uniform distribution of silica in the sintered product.

The alumina particles used to produce the support materials preferably have a particle size distribution with the d50 of preferably no more than 10 μm, more preferably no more than 5 μm, even more preferably no more than 2 μm, yet even more preferably no more than 1 μm and most preferably no more than 0.6 μm. In a preferred embodiment, the d50 of the alumina phase particles is 0.6±0.2 μm or 0.6±0.1 μm.

Higher d50 sizes may lead to increase void spaces between particles resulting in the second phase disproportionately pooling into these voids during the sintering/densification process. This pooling of the second phase into concentrated regions of the alumina matrix can result in the formation of region more prone to fracture, thus reducing the strength of the support. Furthermore, the non-uniform distribution of the second phase can also result in poorer leachability.

Void (pore) sizes less than 20 μm are preferred but not essential. Void (pore) sizes of less than 10 μm or less than 5 μm are readily achievable.

The particles forming the second phase preferably has a d50 less than the particles making up the alumina matrix phase. Preferably, the second phase particles have a d50 of less than 2 μm, more preferably less than 1 μm and even more preferably 0.5±0.2 μm or 0.5±0.1 μm. Finer particles are able to more readily disperse throughout the alumina phase particles or agglomerates thereof and during the sintering process more readily melt and interpenetrate between the alumina matrix. This invention contemplates materials having modulus of rupture above 250 MPa, above 300 MPa, and above 350 MPa.

EXAMPLES

Example 1—Porosity as Second Phase

A 99.8 wt % pure alumina powder [Grade 998E powder from Morgan Advanced Materials (from their Latrobe facility); a sub-micron powder with a d50 less than one micron] was pressed or extruded to form rods and other shapes which were fired at 1350° C. with a ramp time 2.5 hours to 1350° C., soak for 1.5 to 2 hours, ramp down time of 0.5 to 1.5 hours with a total cycle time of 5-6 hours to provide porous sintered alumina shapes, including cylindrical rods having a cross section ranging from ~0.25 mm to ~40 mm (~0.010" to 1.6"), and having a porosity in the range 5-7%.

Example 2—Leachable Material as Second Phase

A 99.8 wt % alumina powder [Grade 998E powder from Morgan Advanced Materials (from their Latrobe facility); a sub-micron powder with a d50 less than one micron] was mixed with sub-micron silica [Grade GP3i from Harbison Walker] and a resin binder in proportions to create a 97 wt % alumina (3 wt % silica) containing mixture (excluding the resin binder). Appropriate resin binders may include combinations of thermoplastic waxes, such as Okerin 1865Q™ and Strahl and Pitsch 462-C™

The mixture was pressed or extruded to form rods and other shapes which were fired at 1650° C. with a ramp time of 14 hours to 1650° C., soak for 2 hours, ramp down time of 8 hours for a total cycle time of 24 hours to provide fully sintered alumino-silicate cylindrical shapes, including rods having a cross section ranging from ~0.25 mm to ~40 mm (0.010" to 1.6").

Example 3—Leachable Material as Second Phase

A 99.8% alumina powder [Grade 998E powder from Morgan Advanced Materials (from their Latrobe facility); a sub-micron powder with a d50 less than one micron] was mixed with sub-micron silica [Grade GP3i from Harbison Walker] and resin binder in proportions to create a inorganic mixture of 95 wt % alumina and 5 wt % silica.

The mixture was pressed or extruded to form rods and other shapes (preferably using a resin binder) which were fired at 1650° C. with a ramp time of 14 hours to 1650° C., soak for 2 hours, ramp down time of 8 hours for a total cycle time of 24 hours to provide fully sintered alumino-silicate cylindrical shapes, including rods having a cross section ranging from ~0.25 mm to ~40 mm (0.010" to 1.6").

PROPERTIES OF EXAMPLES

Modulus of rupture of the rods of examples 1 to 3 and supports #1 to #14 were measured using a 3-point method [ASTM D790]. The samples measured were ~35 mm (1⅜") sections cut from 0.79 mm (0.031") diameter circular cross-section rods of material.

TABLE 1

| Rod material | As received modulus of rupture MPa [psi] |
| --- | --- |
| Example 1 | ~358 (51928) |
| Example 2 | ~368 (53410) |
| Example 3 | ~338 (49083) |

All examples showed a modulus of rupture significantly above that of quartz measured under the same conditions, and showed greater susceptibility to leaching than dense alumina. Although the leachability of comparative example 1 was lower than examples comprising the second phase of leachable material. The lower leachability of comparative example 1 may be contributable to the refractory nature of the intergrain bonding in the alumina only material.

It is to be noted that for best results the silica used in manufacture of alumino-silicates in accordance with this invention should be fine materials to avoid excessive weakening of the structure of the support material. Typically, silicas with a d50<1 μm are used and good results may be achieved with d50 in the range 0.5±0.2 μm or d50 in the range 0.5±0.1 μm. The present invention is not limited to these particular ranges however with larger silica particle sizes still able to produce acceptable MOR and leachability performance, particularly when the silica content is adjusted (e.g. decreased) accordingly.

Effect of Silica Particle Size

Sample A 200 Mesh (74 μm) sample with a d50 of 23.5 μm

Sample B 325 Mesh (44 μm) sample with a d50 of 15.19 μm

Sample C 600 Mesh (16 μm) sample with a d50 of 5.8 μm

Support rods were prepared consistent with the methodology used in Example 2, with the modulus of rupture and the leachability of the supports rods measured after being placed in 30 wt % NaOH aqueous solution for 20 hours at 300° F. and 185 psi within an autoclave.

TABLE 2

| Support # | Silica % wt | MOR kpsi (MPa) | Support OD | leachability % wt loss |
| --- | --- | --- | --- | --- |
| 1 | 1 wt % Sample A | 35.2 (242) | 0.03" | |
| 2 | 1 wt % Sample B | 55 (379) | 0.03" | |
| 3 | 1 wt % Sample C | 61 (420) | 0.03" | |
| 4 | 3 wt % Sample A | 21.5 (148) | 0.03" | |
| 5 | 3 wt % Sample B | 31 (214) | 0.03" | |
| 6 | 3 wt % Sample C | 44 (303) | 0.03" | 11% |
| 7 | 5 wt % Sample A | 21.4 (147) | 0.03" | |
| 8 | 5 wt % Sample B | 28 (193) | 0.03" | |
| 9 | 5 wt % Sample C | 37 (255) | 0.03" | |
| 10 | 5 wt % Sample C | 46 (317) | 0.09" | 12% |
| 11 | 7 wt % Sample C | 44 (303) | 0.09" | 19.5% |
| 12 | 10 wt % Sample C | 34 (234) | 0.09" | |
| 13 | 100 wt % | 30 (207) | 0.05" | 100% |
| 14 | 0 wt % 100 wt % alumina | 80 (552) | 0.09" | −1%* |

*a small increase in weight was thought to be due to the reaction with NaOH during the leaching process.

As indicated in Table 2 (and examples 2 and 3), the MOR is dependent on both the quantity of the added silica and the fineness of the silica particle size distribution. While not wanting to be held by theory, it is thought that the finer silica particles enable the silica phase to more readily melt and create a more uniform thin leachable pathway around the alumina matrix phase. The uniform distribution of silica provides a good balance between strength and leachability. Green support structures with larger silica particles have a greater propensity to form silica pooling during the sintering process, in which silica is concentrated into specific regions of the supports. These concentrated regions are thought to compromise the integrity of the structure, thereby reducing the MOR, whilst the uneven distribution of the silica phase may also inhibit leachability of the supports. Through fine tuning the particle size distribution of the support mixture, the required balance of strength and leachability may be achieved.

Figure 5:
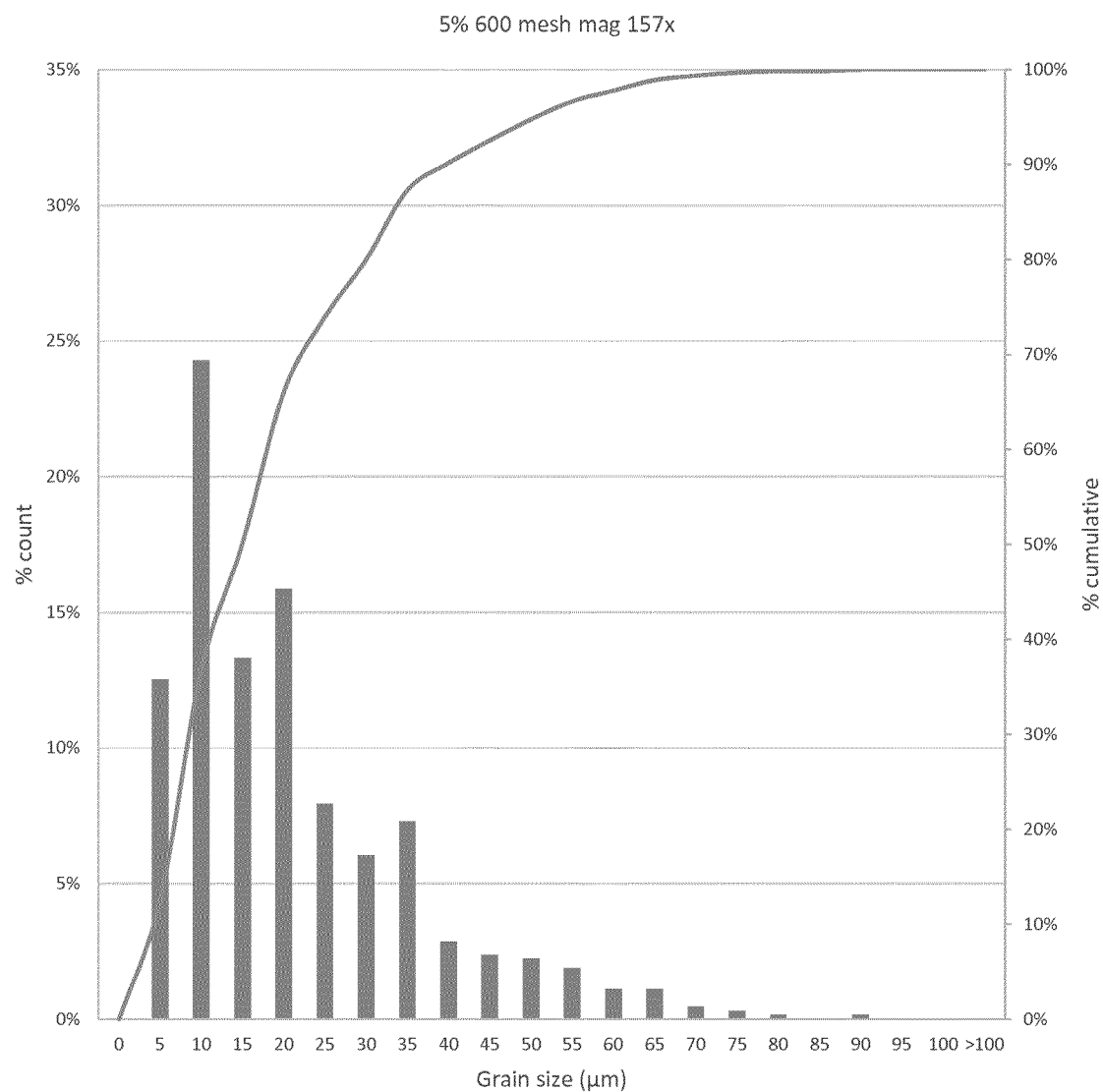
FIG. 5 is the grain size distribution chart of the support of FIG. 3.
Figure 6:
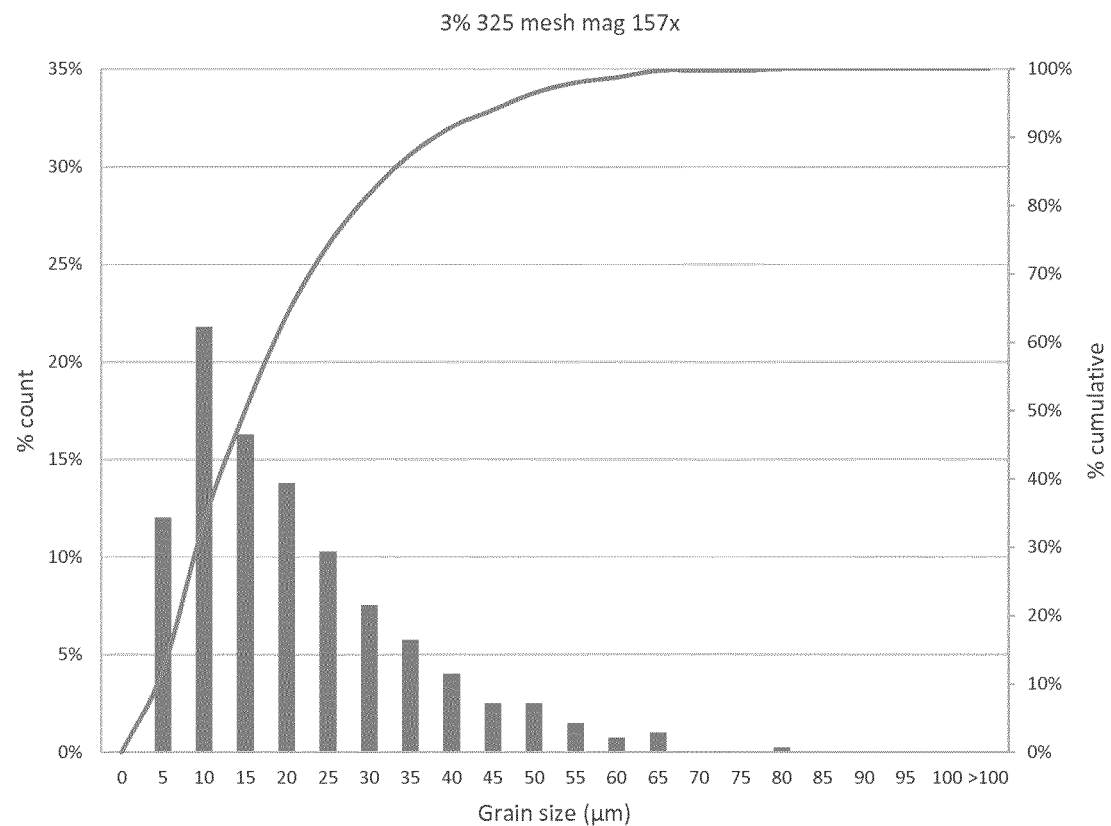
FIG. 6 is the grain size distribution chart of the support of FIG. 1.

As indicated in Tables 2 & 3, the coarser silica particle used in the manufacture of support #5 results in a support structure with an increased porosity, pore and glass phase size relative to the finer silica used in the formation of support #6. Corresponding SEM images and particle size distribution charts (FIGS. 1, 2a, 4 & 6) also highlight the greater uniformity of silica distribution (light phase) within the alumina phase (dark phase), with a higher proportion of silica pooling appearing in FIG. 1. When a portion of support #6 cross section was examined under higher magnification (FIG. 2b), it revealed a fine network of pores and silica phase distributed throughout the alumina phase providing a leachable pathway. FIGS. 3 and 5 illustrates that even with increased silica levels of 5 wt %, a uniform distribution of silica is maintained thereby contributing to the desirable balance of good mechanical strength (e.g. MOR>210 MPa and leachability of at least 8 wt % loss after 20 hours at 300° F. and 185 psi in a NaOH solution).

Image Analysis for Determination of Porosity. Pore and Silica Phase Sizes

Image analysis were performed on the polished SEM samples. Micrographs were analysed using Clemex™ image analysis software to obtain measurements on pore size, porosity and grain size of the glass phase.

The imaging method uses contrast in greyscale images of the polished surface. The pores (voids) are selected as they are darker; in a histogram of grey shade from white to black in an image against frequency, these form a sharp peak near the black end. However, as the edge of the image is also black, they are only selected within a circle of defined radius within the image. When these are selected, some single pixel black spots resulting from noise in the image are also selected. These are therefore removed by applying a filter removing any selected object of 1 pixel. As the regions towards the edge of a pore tend to be reduced in this way, to select the whole pore a reverse fill function is used, adding three layers of pixels around any object. The total area of highlighted objects is then recorded. This is not the true porosity as the calculated area % covers the whole image. This area % is then divided by the area percent the circle used to select pores forms of the total image. This correction gives the true pore % based upon the cross-section surface of the support. The % volume of pores is taken to be the same as the % surface area covered by the pores. When the pore area % is measured, the length of each feature is also recorded. The pore size is taken to be the largest linear dimension of the pore cross section.

The silica based grain size was measured based on contrast in images. Several grey filters were applied to the original image to isolate as many grain boundaries as possible. The grain network was binarized using Grey Threshold. A filter has also applied to remove any object with a size smaller than 2×2 pixel so as to exclude noise spots due to photo quality. Objects were separated based on their convexity to reconstruct grains. The isolated grains were measured in the length and width. Grain size was taken as the average of the main lengths. User input was required during the Grey Threshold step, however this measurement allowed a best separation of individual grains from agglomerates.

TABLE 3

Figure 2A:
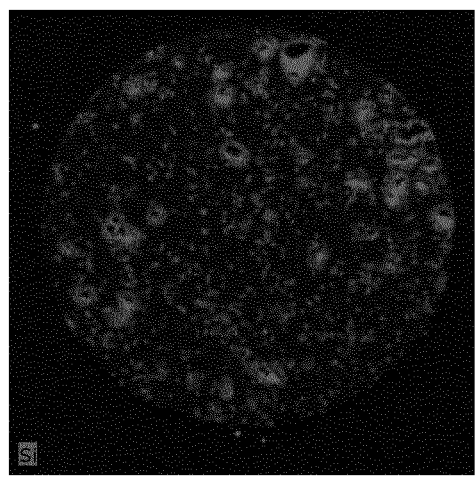
FIG. 2a is a SEM image under 157× magnification of a support having 3 wt % silica produced from 600 mesh silica particles.
Figure 2B:
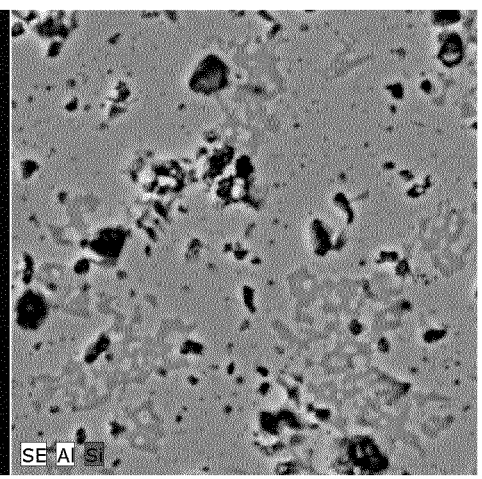
FIG. 2b is a SEM image under 2000× magnification of a support having 3 wt % silica produced from 600 mesh silica particles.
Figure 3:
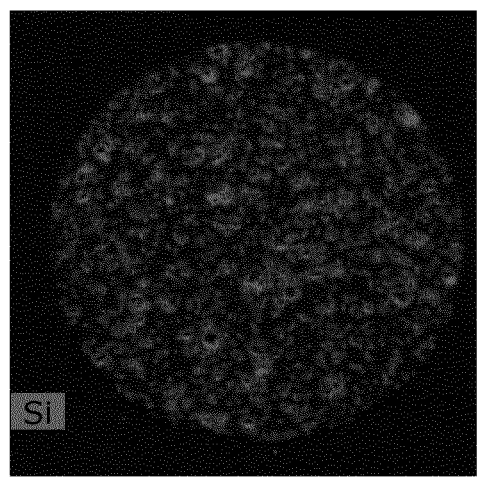
FIG. 3 is a SEM image under 157× magnification of a support having 5 wt % silica produced from 600 mesh silica particles.
Figure 4:
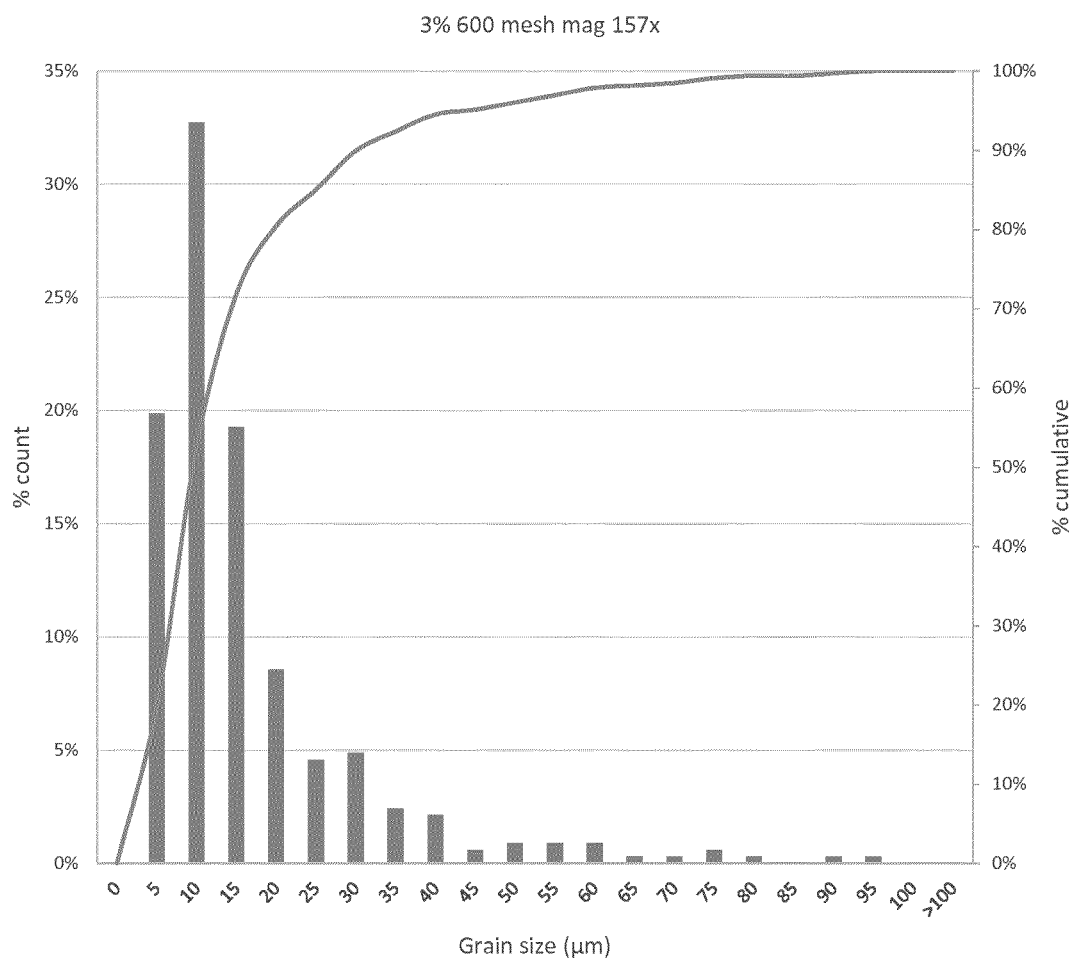
FIG. 4 is a grain size distribution chart of the support of FIG. 2.

| Support# | Magnification | Porosity % | Pore size (µm) | Silica phase size (µm) |
| --- | --- | --- | --- | --- |
| 5 FIG. 1 | 157x | 10.706 | 4.228 | 18.466 |
| 6 FIG. 2a | 157x | 5.166 | 3.681 | 14.448 |
| 6 FIG. 2b | 2000x | 10.649 | 0.636 | 3.108 |
| 9 FIG. 3 | 157x | 7.362 | 3.904 | 18.762 |

The invention claimed is:

1. Supports for supporting mold parts and/or cores in investment casting, comprising a leachable support material comprising:
   a mechanically supportive continuous matrix phase comprising alumina;
   at least one second phase interpenetrating the mechanically supportive continuous matrix phase and providing a pathway for leachants to penetrate into the material, wherein the supports are dimensioned to support the mold parts and/or cores in investing casting, and wherein the leachable support material comprises:
   in the range of 1 wt. % and 12 wt. % of the second phase, and the second phase interpenetrates the matrix and provides a pathway for leachants to penetrate into the material; and
   less than 15 vol. % voids;
   wherein a first material used to form the mechanically supportive continuous phase in the supports has a first particle size distribution including a first d50 and a second material used to form the second phase in the supports has a second particle size distribution and a second d50 such that the second phase is uniformly distributed throughout the matrix phase, providing leachability and strength of the supports; and
   wherein the first d50 is greater than the second d50.

2. The supports of claim 1, wherein the first d50 is no more than 1 µm and the second d50 is less than 1 µm.

* * * * *